(12) United States Patent
Goldman et al.

(10) Patent No.: US 11,922,190 B2
(45) Date of Patent: Mar. 5, 2024

(54) SYSTEMS AND METHODS FOR AUTONOMOUS PROVISION OF DESKTOP AS A SERVICE (DAAS)

(71) Applicant: Citrix Systems, Inc., Ft. Lauderdale, FL (US)

(72) Inventors: Alan Goldman, Tampa, FL (US); Michael J. Sabin, Boca Raton, FL (US); Radhesham Shah, Parkland, FL (US); Leo C. Singleton, Ft. Lauderdale, FL (US); Kireeti A. Valicherla, Parkland, FL (US)

( * ) Notice: Subject to any disclaimer, the term of this patent is extended or adjusted under 35 U.S.C. 154(b) by 757 days.

(21) Appl. No.: 17/032,001

(22) Filed: Sep. 25, 2020

(65) Prior Publication Data

US 2022/0035642 A1    Feb. 3, 2022

Related U.S. Application Data

(63) Continuation of application No. PCT/US2020/044675, filed on Aug. 1, 2020.

(51) Int. Cl.
*G06F 9/451* (2018.01)
*G06F 9/455* (2018.01)
(Continued)

(52) U.S. Cl.
CPC .......... *G06F 9/452* (2018.02); *G06F 9/45558* (2013.01); *G06Q 30/016* (2013.01);
(Continued)

(58) Field of Classification Search
CPC ................. G06F 9/452; G06F 9/45558; G06F 2009/45562; G06F 2009/45595; G06Q 30/016; H04L 63/20
See application file for complete search history.

(56) References Cited

U.S. PATENT DOCUMENTS 6,683,877 B1    1/2004    Gibbs et al.
6,785,713 B1    8/2004    Freeman et al.
(Continued)

FOREIGN PATENT DOCUMENTS

EP          2403207 A1       1/2012
KR    10-2016-0100713 A      8/2016

OTHER PUBLICATIONS

PCT Search Report and Written Opinion for Application No. PCT/US2020/044675 dated Apr. 12, 2021, 10 pages.
(Continued)

*Primary Examiner* — Wissam Rashid

(57) ABSTRACT

A computer system configured to autonomously provision at least a portion of a desktop as a service (DaaS) system is provided. The computer system includes a memory, a network interface, and a processor configured to receive, via the network interface, a request to add a catalog of virtual desktops to an account associated with a tenant of the computing service, and transmit, in response to reception of the request, a plurality of requests to the computing service. The plurality of requests comprise at least one request to create a first virtual network associated with the tenant within the computing service, at least one request to connect the first virtual network to a second virtual network within the computing service, and at least one request to create the catalog within the computing service.

19 Claims, 6 Drawing Sheets

(51) Int. Cl.
    *G06Q 30/016*     (2023.01)
    *H04L 9/40*     (2022.01)

(52) U.S. Cl.
    CPC .... *H04L 63/20* (2013.01); *G06F 2009/45562* (2013.01); *G06F 2009/45595* (2013.01)

(56) References Cited

U.S. PATENT DOCUMENTS

| | | | |
|---|---|---|---|
| 7,724,657 | B2 | 5/2010 | Rao et al. |
| 7,978,714 | B2 | 7/2011 | Rao et al. |
| 8,458,222 | B2 | 6/2013 | Bobick |
| 8,650,299 | B1 | 2/2014 | Huang et al. |
| 8,904,477 | B2 | 12/2014 | Barton et al. |
| 8,910,112 | B2 | 12/2014 | Li |
| 8,914,845 | B2 | 12/2014 | Barton et al. |
| 9,086,897 | B2 | 7/2015 | Oh |
| 9,176,744 | B2 | 11/2015 | Lee |
| 9,521,117 | B2 | 12/2016 | Barton et al. |
| 9,538,345 | B2 | 1/2017 | Sah et al. |
| 10,862,948 | B1* | 12/2020 | Britt ................ H04L 41/22 |
| 11,068,136 | B1* | 7/2021 | Koushik ............ G06F 3/0482 |
| 2006/0143282 | A1 | 6/2006 | Brown |
| 2007/0180485 | A1 | 8/2007 | Dua |
| 2008/0086564 | A1 | 4/2008 | Putman |
| 2009/0199175 | A1 | 8/2009 | Keller |
| 2011/0138047 | A1 | 6/2011 | Brown |
| 2014/0123135 | A1 | 5/2014 | Huang et al. |
| 2014/0280738 | A1* | 9/2014 | Kolker ............... H04L 12/46 709/218 |
| 2015/0058969 | A1 | 2/2015 | Ringdahl et al. |
| 2015/0339136 | A1 | 11/2015 | Suryanarayanan et al. |
| 2016/0036920 | A1 | 2/2016 | Sama |
| 2016/0183351 | A1 | 6/2016 | Snyder |
| 2017/0019386 | A1 | 1/2017 | Ylonen |
| 2017/0099160 | A1 | 4/2017 | Mithyantha |
| 2017/0111446 | A1 | 4/2017 | Rivera et al. |
| 2017/0192835 | A1 | 7/2017 | Narayanan |
| 2019/0356701 | A1 | 11/2019 | Prabhu |

OTHER PUBLICATIONS

Eaves et al., "Desktop as a Service Proof of Concept", 2012 (Year: 2012).
Citrix Managed Desktops. (2019). Retrieved Sep. 24, 2020, from https://docs.citrix.com/en-us/citrix-managed-desktops.
Citrix Staff. (2011). Citrix Reference Architecture for Multi-Tenant Desktop as a Service, 56 pages.
Citrix Staff (2020), Citrix Managed Desktops, Citrix Product Documentation, docs.citrix.com, Published Jul. 15, 2020, 118 pages.
Citrix Staff. (Jul. 9, 2019). Citrix Managed Desktops. Retrieved Sep. 24, 2020, from https://docs.citrix.com/en-us/citrix-managed-desktops.
Lau, V., & Valicherka, K. (2019). LAB601: Delivering Windows Virtual Desktops using Citrix Managed Desktops offering, 88 pages.
Citrix Staff. (Jul. 9, 2019). Citric Managed Desktops. Retrieved Sep. 24, 2020, from http://web.archive.org/web/20190716080155/https://docs.citrix.com/en-us/citrix-managed-desktops.

* cited by examiner

SYSTEMS AND METHODS FOR AUTONOMOUS PROVISION OF DESKTOP AS A SERVICE (DAAS)

CROSS-REFERENCE TO RELATED APPLICATION

This application claims the benefit under 35 U.S.C. § 120 as a continuation of PCT Application No. PCT/US20/44675, titled "DESKTOP AS A SERVICE SYSTEM," filed on Aug. 1, 2020, which designates the United States. The aforementioned application is hereby incorporated herein by reference in its entirety.

BACKGROUND

The wide variety of computing devices currently available to the public enable users to select particular configurations that suit personal preferences. These computing devices include various combinations of operating systems, applications, and user settings. Management of such a set of heterogenous devices, in volume, can be troublesome. As such, many organizations are migrating to virtualized applications and/or desktops to provide a more standardized, secure, and scalable computing environment to their users. Using these virtualization tools, an organization's applications and data are executed within execution environments that are isolated from the user's computing device of choice (e.g., smartphone, tablet, laptop, desktop computer, etc.).

One particular category of virtualization is referred to as Virtual Desktop Infrastructure (VDI). In VDI a user's computing session is executed inside a virtual machine that resides on a server. VDI and other server-based desktop virtualization systems may provide personalized desktops for each user, while allowing for centralized management and security. Servers in VDI systems store images of virtual desktops. These images include system configuration information and software components and can be used to create virtual machines that provide virtual desktops to users via a browser or client application hosted by a personal computing device. For example, a VDI server can include one or more hypervisors (virtual machine managers) to create and maintain multiple virtual machines, software to manage the hypervisor(s), a connection broker, and software to provision and manage the virtual desktops. In some embodiments, a VDI server(s) may provide access to shared server-based hosted applications, as well as Web/Software-as-a-Service (SaaS) applications.

SUMMARY

In at least one example, a computer system is provided. The computer system is configured to autonomously provision at least a portion of a desktop as a service (DaaS) system via a computing service. The computer system includes a memory, a network interface, and at least one processor coupled to the memory and the network interface. The at least one computer system is configured to receive, via the network interface, a request to add a catalog of virtual desktops to an account associated with a tenant of the computing service, and transmit, in response to reception of the request, a plurality of requests to the computing service. The plurality of requests comprise at least one request to create a first virtual network associated with the tenant within the computing service, at least one request to connect the first virtual network to a second virtual network within the computing service, and at least one request to create the catalog within the computing service.

At least some examples of the computer system can include one or more of the following features. In the computer system, the tenant can be a first tenant and the at least one processor can be further configured to receive, via the network interface, at least one request to add at least one catalog to at least one account associated with a second tenant of the computing service, the second tenant being distinct from the first tenant and transmit, in response to reception of the at least one request, at least one plurality of requests to the computing service. The at least one plurality of requests can comprise at least one request to create at least one virtual network associated with the second tenant within the computing service, at least one request to connect the at least one virtual network to the second virtual network, and at least one request to create the at least one catalog within the computing service.

In the computer system, the second virtual network can be associated with and administered by a third tenant distinct from the first tenant and the second tenant. The memory can store first account information associating the first tenant with a first account within the computing service; second account information associating the second tenant with a second account with the computing service; and third account information associating the third tenant with a third account with the computing service, the first account information, the second account information, and the third account information can be distinct from one another. The plurality of requests can further comprise at least one request to create a connector, the connector being configured to couple one or more virtual desktops to a virtualization infrastructure and at least one request to connect the connector to the first virtual network. The plurality of requests can further comprise at least one request to configure one or more security rules of the first virtual network. The second virtual network can provide connectivity to a directory service.

In the computer system, the tenant can be a first tenant, the second virtual network can be administered by and associated with a second tenant distinct from the first tenant, and the directory service can be administered by and associated with the second tenant. The directory service can store objects for virtual machines and connectors and omitting objects for users. The at least one processor can be further configured to transmit, to the computing service, at least one request to create a virtual desktop based on a master image specified in the catalog; and transmit, to the computing service, at least one request to connect the virtual desktop to the first virtual network. The at least one processor can be further configured to receive, via the network interface, a troubleshooting request to add a bastion to the first virtual network; and transmit, in response to reception of the troubleshooting request, a one or more requests to the computing service. The one or more requests can comprise at least one request to create the bastion, at least one request to connect the bastion to the first virtual network, and at least one request to update security rules applicable to the first virtual network to enable external access to the bastion.

In the computer system, the at least one processor can be further configured to receive, via the network interface, a build request to build a master image, the build request specifying an image upon which to base the master image; and transmit, in response to reception of the build request, a one or more requests to the computing service. The one or more requests can include at least one request to create a virtual machine, at least one request to reimage the virtual machine using an image specified in the build request, at least one request to connect the virtual machine to the first virtual network, and at least one request to update security rules applicable to the first virtual network to enable external access to the virtual machine. The computer system can further include the computing service. The computing service can be an infrastructure as a service (IaaS) system. The plurality of requests can be a plurality of application programming interface calls to the IaaS system.

In another example, a method of autonomously provisioning at least a portion of a desktop as a service (DaaS) system is provided. The method includes receiving, via a network interface, a request to add a catalog of virtual desktops to an account associated with a tenant of a computing service, and transmitting, in response to reception of the request, a plurality of requests to a computing service. The plurality of requests include at least one request to create a first virtual network associated with the tenant within the computing service, at least one request to connect the first virtual network to a second virtual network within the computing service, at least one request to create the catalog within the computing service, at least one request to create a connector, the connector being configured to couple one or more virtual desktops to a virtualization infrastructure, and at least one request to connect the connector to the first virtual network.

At least some examples of the method can include one or more of the following features. In the method, the tenant can be a first tenant and the method can further include receiving, via the network interface, at least one request to add at least one catalog to at least one account associated with a second tenant of the computing service, the second tenant being distinct from the first tenant and transmitting, in response to reception of the at least one request, at least one plurality of requests to the computing service. The at least one plurality of requests can include at least one request to create at least one virtual network associated with the second tenant within the computing service, at least one request to connect the at least one virtual network to the second virtual network, the second virtual networking being associated with and administered by a third tenant distinct from the first tenant and the second tenant, and at least one request to create the at least one catalog within the computing service. The method can further include transmitting, to the computing service, at least one request to create a virtual desktop based on a master image specified in the catalog and transmitting, to the computing service, at least one request to connect the virtual desktop to the first virtual network.

In another example, a non-transitory computer readable medium storing executable sequences of instructions to autonomously provision at least a portion of a desktop as a service (DaaS) system is provided. The sequences of instructions include instructions to receive, via a network interface, a request to add a catalog of virtual desktops to an account associated with a tenant of a computing service, and transmit, in response to reception of the request, a plurality of requests to a computing service. The plurality of requests can include at least one request to create a first virtual network associated with the tenant within the computing service, at least one request to connect the first virtual network to a second virtual network within the computing service, at least one request to create the catalog within the computing service, at least one request to create a connector, the connector being configured to couple one or more virtual desktops to a virtualization infrastructure, and at least one request to connect the connector to the first virtual network.

At least some examples of the non-transitory computer readable medium can include one or more of the following features. Within the sequences of instructions, the tenant can be a first tenant, the sequences of instructions further include instructions to receive, via the network interface, at least one request to add at least one catalog to at least one account associated with a second tenant of the computing service, the second tenant being distinct from the first tenant and transmit, in response to reception of the at least one request, at least one plurality of requests to the computing service. The at least one plurality of requests can include at least one request to create at least one virtual network associated with the second tenant within the computing service, at least one request to connect the at least one virtual network to the second virtual network, the second virtual networking being associated with and administered by a third tenant distinct from the first tenant and the second tenant, and at least one request to create the at least one catalog within the computing service. The sequences of instructions further include instructions to transmit, to the computing service, at least one request to create a virtual desktop based on a master image specified in the catalog and transmit, to the computing service, at least one request to connect the virtual desktop to the first virtual network.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
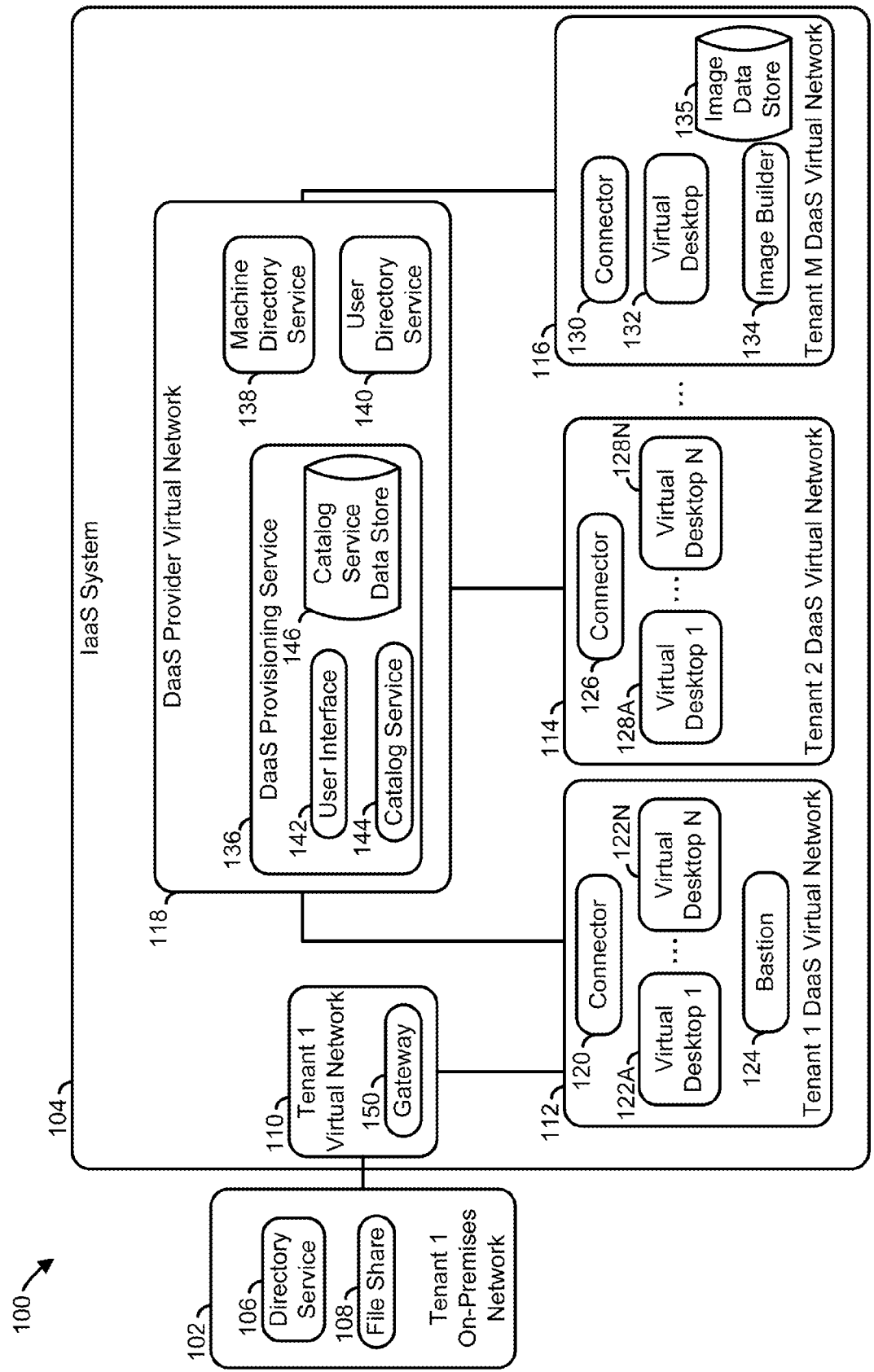
FIG. 1 is a block diagram depicting a Desktop as a Service (DaaS) system including a DaaS provisioning service in accordance with one or more examples described herein.

As summarized above, various examples described herein are directed to systems and processes that autonomously configure, using a limited set of information provided by an end user, a cloud computing service to implement a DaaS system for subsequent administration by a DaaS provider. The cloud computing service may be, for example, an Infrastructure as a Service (IaaS) system. The systems and processes described herein improve upon other systems and processes used to configure DaaS systems by decreasing the amount and specificity of information required to configure a DaaS system. These decreased information requirements, in turn, enable the DaaS system to be configured in a new way—one without a need for deep technical understanding of the IaaS system underlying the DaaS system. Examples of configuration information that can be omitted in accordance with the examples described herein include information required to setup an account in the IaaS system, information required to configure virtual networks within the IaaS system, information required to connect certain virtual networks within the IaaS system, information required to configure certain security rules for the virtual networks, and information required to provision virtual agents within virtual desktops managed within the DaaS system.

More specifically, some examples include a catalog service authorized to interoperate with an IaaS system on behalf of the DaaS provider. The IaaS system can be, for example, MICROSOFT AZURE IaaS, which is commercially available from Microsoft Corporation of Redmond, Washington. In these examples, the catalog service receives requests to configure a DaaS system for use by identified customers. In response to reception of each of these requests, the catalog service autonomously creates an account with the IaaS system for the identified customer that is controlled by the DaaS provider. Customers associated with an account may be referred to herein as tenants and information regarding these accounts may be referred to herein as account information. Creation of a dedicated account within the IaaS system for each tenant increases security afforded to each tenant.

In some examples, the catalog service receives requests to create catalogs of virtual desktops. A catalog is a grouping mechanism that allows one or more virtual desktops to be created, identified, and managed as a collective. In response to reception of each of these requests, the catalog service determines whether a virtual network for the administration of the catalog exists for the tenant. Such a virtual network may be referred to herein as a DaaS virtual network. If the catalog service determines that no DaaS virtual network associated with the tenant exists, the catalog service autonomously creates a DaaS virtual network that is under control of the DaaS provider and associated with the tenant. Creation of this DaaS virtual network can include creation of virtual connectors that enable virtual desktops connected to the virtual network to interoperate with a virtualization infrastructure. This virtualization infrastructure, in turn, enables users associated with a tenant to interact with virtual desktops within interactive computing sessions. Creation of the DaaS virtual network can further include connecting the DaaS virtual network to at least one other virtual network. This connection can allow the virtual connectors, and potentially other virtual machines connected to the DaaS virtual network, to join a domain by interoperating with a directory service connected to the other virtual network. The directory service can be shared with other tenants and administered by the DaaS provider or dedicated to and administered by the tenant.

In some examples, the catalog service receives requests to create one or more virtual desktops to make the one or more virtual desktops available to users associated with tenants. In response to reception of each of these requests, the catalog service creates the requested virtual desktop from a master image and connects the virtual desktop to the DaaS virtual network.

In some examples, the catalog service receives requests to build master images that can be used to create virtual desktops and other types of virtual machines. These requests may be received, for example, from users associated with a tenant. In response to reception of each of these requests, the catalog service identifies an account in which the master image is to be created. This account can be an account controlled by the DaaS provider or an account controlled by the tenant. In addition, responsive to reception of each of the requests to build master images, the catalog service creates a virtual machine from a base image identified in request and connects the virtual machine to a virtual network. This base image can include, for example, an operating system and one or more software applications, such as a virtualization agent. The virtual network to which the catalog service connects the virtual machine can be the DaaS virtual network where the account in which the master image is to be created is controlled by the DaaS provider. Also responsive to reception of each of the requests to build master images, the catalog service reconfigures security rules associated with the virtual network to enable an external device to access the virtual machine for customization purposes. The catalog service can subsequently receive a request to finish the master image build. In response to reception of this request, the catalog service generates a new master image from the customized virtual machine and deletes the virtual machine.

In some examples, the catalog service receives requests to create virtual bastions from users associated with a tenant. A bastion is a specialized type of virtual machine that can be accessed by a device external to the virtual network for troubleshooting purposes. In response to reception of each of these requests, the catalog service identifies a catalog targeted for association with the virtual bastion. In some examples, this catalog must comprise virtual desktops configured to join a domain by interoperating with a directory service dedicated to and administered by the tenant requesting the virtual bastion. In addition, responsive to reception of each of the requests to create virtual bastions, the catalog service creates a virtual machine from a bastion image and connects the virtual machine to the DaaS virtual network. Also responsive to reception of each of the requests to create virtual bastions, the catalog service reconfigures security rules associated with the DaaS virtual network to enable an external device to access the virtual machine for troubleshooting purposes. The catalog service can subsequently delete the virtual machine after a threshold period of time as elapsed.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

DaaS Provisioning System

In some examples, a computer system is configured to autonomously provision a DaaS system by adapt portions of an Infrastructure as a Service (IaaS) system for subsequent administration by a DaaS provider. FIG. 1 illustrates a logical architecture of a DaaS system 100 that includes several computer-implemented processes in accordance with these examples.

As shown in FIG. 1, the DaaS system 100 includes an on-premises network 102 that is owned and administered by a first tenant (tenant 1) of an IaaS system 104. The on-premises network 102 includes computing devices and associated infrastructure configured to host a directory service 106 and a file share 108. The IaaS system 104 includes computing devices and associated infrastructure configured to host virtual networks 110 through 118. The virtual network 110 is associated with tenant 1 and includes a gateway 150. The virtual network 112 is also associated with tenant 1 and includes a connector 120, a plurality of virtual desktops 122A-122N, and a bastion 124. The virtual network 114 is associated with a second tenant (tenant 2) and includes a connector 126 and a plurality of virtual desktops 128A-128N. The virtual network 116 is associated with another tenant (tenant M) and includes a connector 130, a virtual desktop 132, an image builder 134, and an image data store 135. The virtual network 118 is associated with a tenant who is also a DaaS provider. The virtual network 118 includes a DaaS provisioning service 136, a machine directory service 138, and a user directory service 140. The DaaS provisioning service 136 includes a user interface 142, a catalog service 144, and a catalog service data store 146. The virtual desktops 122A-122N, 128A-128N, and 132 are virtual machines configured to be used by users associated with tenant 1, tenant 2, and tenant M. As such, the machine performance profile, operating system, application suite, etc. of a virtual desktop can vary from example to example. In a similar fashion, the virtual networks 110, 112, 114, and 116 are virtual constructs (e.g., routers, switches, firewalls, etc.) within, for example, the IaaS system 104. Virtual networks 110, 112, 114, and 116 can each be associated with an address space, one or more subnets, and routing tables. Within MICROSOFT AZURE IaaS, the virtual networks 110, 112, 114, and 116 can be implement as VNets.

The computer-implemented processes illustrated in FIG. 1 can communicate with one another using a variety of techniques. These techniques can include inter-process communication (e.g., where two or more of the computer-implemented processes illustrated in FIG. 1 reside within the same execution environment) and network-based communication (e.g., where two or more of the computer-implemented processes reside in different execution environments coupled to one another by a computer network). In some examples, communications can include hypertext transfer protocol (HTTP) based communications. It should be noted that the computer-implemented process illustrated in FIG. 1 can be implemented in hardware or a combination of hardware and software.

Continuing with the example of FIG. 1, the virtual network 118 is a communications network (e.g., a virtual local area network) made up of and interconnecting virtual machines (e.g., virtual servers) dedicated to and administered by the DaaS Provider. The virtual machines interconnected within the virtual network 118 are configured to host the DaaS provisioning service 136, the machine directory service 138, and the user directory service 140.

As shown in FIG. 1, the DaaS provisioning service 136 is configured to interoperate with an application (e.g., a browser executing on a computing device associated with a customer-to-become-tenant) to provision a DaaS system from the IaaS system 104 for use by the customer-to-become-tenant. The provisioned DaaS is to be administered by a DaaS provider. As shown in FIG. 1, the user interface 142 is configured to interoperate with the application to render user interface controls to the user. These user interface controls can interact with the user to receive input specifying configuration information. The user interface 142 is configured to process this configuration information to generate and transmit a variety of request messages to the catalog service 144 via an application programming interface (API) exposed and implemented by the catalog service 144. Examples of these request messages include requests to establish a DaaS system for a potential customer, requests to create catalogs of virtual desktops, requests to create instances of virtual desktops, requests to build master images for use in the DaaS system, and requests to create virtual bastions, just to name a few.

In some examples, the catalog service 144 is configured to receive and process the request messages from the user interface 142 described above. This processing by the catalog service 144 includes generation and transmission of a variety of request messages to the IaaS system 104 via an API exposed and implemented by the IaaS system 104. Specific examples of these processes are described further below with reference to FIGS. 2-4. To execute these processes, the catalog service 144 can be configured to access the catalog service data store 146 to retrieve and store various records. As is described in further detail below, these records can associate IaaS accounts with tenants who utilize the DaaS system, tenants with particular virtual networks, and virtual networks with types of virtual desktop connections. As such, the records of the catalog service data store can include fields configured to store identifiers of IaaS accounts, identifiers of tenants, identifiers of virtual networks, and identifiers of types of virtual networks. Additionally, in some examples, the catalog service data store 146 can store copies of master images maintained by the DaaS service provider for use by tenants. These master images can include, for example, a pre-installed virtualization agent to allow for virtual desktops based on the master image to connect to the virtualization infrastructure described herein.

In certain examples, the machine directory service 138 is configured to govern a domain administered by the DaaS provider that includes virtual machines of a plurality of tenants. In these examples, the machine directory service 138 can be implemented using, for example, MICROSOFT AZURE active directory domain service, which is commercially available from Microsoft Corporation and can be configured to manage authentication, permissions, and access to virtual machines (e.g., the bastion 124, the connectors 126 and 130, the virtual desktops 128A-128N and 132, and the image builder 134). However, unlike other directory services, the machine directory service 138 is not configured to manage authentication or permissions of users and, as such, the machine directory service 138 includes no objects for such users. This distinction is important because it provides for no access to the machine directory service 138 by users associated with tenants, thereby providing an extra measure of isolation and security, while enabling the virtual machines of the tenants to participate in the overall virtualization infrastructure via their connection to the DaaS provider domain represented in the machine directory service 138.

In some examples, the user directory service 140 is configured to authenticate users associated with tenants. In these examples, the user directory service 140 can be implemented using, for example, MICROSOFT AZURE ACTIVE DIRECTORY, which is commercially available from Microsoft Corporation. However, unlike other directory services, the user directory service 140 is not configured to manage authentication or permissions of machines and, as such, the machine directory service 138 includes no objects for machines. It should be noted that maintaining distinct directory services for machines and users enables the DaaS provision service 136 to provision a DaaS system with lower maintenance burden for the DaaS provider than a directory service that combines users and machines. More specifically, distinct directory services enable the DaaS provider to manage machines collectively across multiple tenants and enable individual tenants to manage their associated users (e.g., by interacting with the user interface 142).

Continuing with the example of FIG. 1, the on-premises network 102 is a communications network (e.g., local area network) made up of and interconnecting with physical devices dedicated to and administered by tenant 1. These physical devices and the virtual resources that they implement constitute a domain of the on-premises network 102 that is governed by a domain controller that hosts the directory service 106. In these examples, the directory service 106 can be implemented using, for example, ACTIVE DIRECTORY, which is commercially available from Microsoft Corporation. More specifically, the directory service 106 is configured to manage authentication, permissions, and access to physical and virtual resources (e.g., the file share 108, the connector 120, the virtual desktops 122A-122N, the bastion 124) within the domain of tenant 1. The directory service 106 is also configured to manage authentication and permissions of users associated with tenant 1. As shown, the on-premises network 102 is connected to the virtual network 110.

Continuing with the example of FIG. 1, the virtual network 110 is a virtual communications network made up of virtual machines (e.g., the gateway 150) dedicated to and administered by tenant 1. The virtual network 110 is connected to the on-premises network 102 and the virtual network 112. The connection between the virtual network 110 and the on-premises network 102 can include an internet-based connection or a private connection (e.g., an EXPRESSROUTE connection which is commercially available from Microsoft Corporation). The connection between the virtual network 110 and the virtual network 112 can include a connection based within the IaaS system 104 and can be established, for example, by peering the two networks within the IaaS system 104 or by using other networking technologies (e.g., a virtual CITRIX SD-WAN, which is commercially available from Citrix Systems, Inc. of Fort Lauderdale, Florida). The gateway 150 is a virtual device configured to secure communications between the virtual resources connected to the virtual network 112 (e.g., the virtual desktops 122A-122N and the connector 120) and the resources connected to the on-premises network 102 (e.g., the file share 108 and the directory service 106). In some examples, the gateway 150 can a implement a virtual private network (VPN) to secure communications between resources.

Continuing with the example of FIG. 1, the virtual network 112 is a communications network made up of and interconnecting virtual devices (e.g., the connector 120, the virtual desktops 122A-122N, and the bastion 124) dedicated to tenant 1. Unlike the virtual network 110, the virtual network 112 is administered by the DaaS provider via, for example, the catalog service 144. Within the virtual network 112, the connector 120 is configured to join to the domain governed by the directory service 106 and to connect the virtual desktops 122A-122N to a virtualization infrastructure that enables users associated with tenant 1 to access the virtual desktops 122A-122N via personal computing devices. One example of such a virtualization infrastructure is described further below with reference to FIG. 6. It should be noted that although only one connector 120 is shown in FIG. 1, in some implementations multiple connectors 120 are utilized to provide improved performance and redundancy. In at least one example, the connector 120 is implemented using a CITRIX CLOUD CONNECTOR, which is commercially available from Citrix Systems, Inc.

In some examples, each of the virtual desktops 122A-122N is created from a master image that is associated with a virtual machine catalog. This master image and catalog specify attributes of virtual desktops, such as processor type, memory, network connection, operating system, and installed applications. In the example of FIG. 1, each of the virtual desktops 122A-122N is also configured to join the domain of tenant 1 by interoperating with the directory service 106 and to enable users associated with tenant 1 to authenticate to the domain via the directory service 106. By doing so, each of the virtual desktops 122A-122N enables users associated with tenant 1 who successfully authenticate to the domain to access domain resources such as the file share 108 via the virtual desktops 122A-122N. Further, each of the virtual desktops 122A-122N is configured enable users to initiate and interact with installed applications and otherwise conduct interactive computing sessions via the virtual desktops 122A-122N, the virtualization infrastructure, and the users' personal computing devices.

In certain examples, the bastion 124 is a virtual machine configured to enable users associated with tenant M to troubleshoot problems within the virtual network 112. These problems can include, for example, problems creating catalogs and/or problems creating virtual desktops using catalogs. In some examples, the bastion 124 is a temporary machine that is created specifically to troubleshoot problems and is deleted after it has been accessed and used. A process orchestrated by the catalog service 144 and involving the bastion 124 is described further below with reference to FIG. 4.

Continuing with the example of FIG. 1, the virtual network 114 is a communications network made up of and interconnecting virtual devices (e.g., the connector 126 and the virtual desktops 128A-128N) dedicated to tenant 2. Like the virtual network 112, the virtual network 114 is administered by the DaaS provider via, for example, the catalog service 144. Unlike the virtual network 112, the connector 126 and the virtual desktops 128A-128N are not configured to join to a domain administered by tenant 2. Rather, the connector 126 and the virtual desktops 128A-128N are configured to join a domain administered by the DaaS provider and governed by the machine directory service 138, as described above. The connector 126 is configured to connect the virtual desktops 128A-128N to a virtualization infrastructure that enables users associated with the tenant 2 to access the virtual desktops 128A-128B via personal computing devices. The virtual desktops 128A-128N are created from a master image that is associated with a virtual machine catalog. In the example of FIG. 1, the virtual desktops 128A-128N are configured to authenticate users by interoperating with the user directory service 140. Further, the virtual desktops 128A-128N are configured to enable users to initiate and interact with installed applications and otherwise conduct interactive computing sessions via the virtual desktops 128A-128N, the virtualization infrastructure, and users' personal computing devices.

Continuing with the example of FIG. 1, the virtual network 116 is a communications network made up of and interconnecting virtual devices (e.g., the connector 130 and the virtual desktop 132) dedicated to tenant M. The connector 130 and the virtual desktop 132 are structured and function analogously to the connector 126 and any one of the virtual desktops 128A-128N. As such, the connector 130 and the virtual desktop 132 operate with respect to tenant M as the connector 120 and any one of the virtual desktops 128A-128N operate with respect to tenant 2. It should be noted that, in at least some examples, security rules applicable to the virtual network 114 and security rules applicable to the virtual network 116 prevent virtual machines connected thereto from communicating across virtual networks.

In some examples, the image builder 134 is a virtual machine configured to enable users associated with tenant M to build new master images. The master images can include, for example, applications needed by particular user groups (e.g., computer aided design software for engineering users) as well as applications needed by all users associated with the tenant M (e.g., an email client, a virtualization agent, etc.). In some examples, the image builder 134 is a temporary machine that is created specifically to build new master images and deleted after the master images are finished and available for use. A process orchestrated by the catalog service 144 and involving the image builder 134 is described further below with reference to FIG. 3. To execute this and other processes, the image builder 134 can be configured to access the image data store 135 to retrieve and store various information. As is described in further detail below, this information includes copies of base and master images maintained by the DaaS service provider and/or the tenants. These base and master images can include, for example, a pre-installed virtualization agent to allow for virtual desktops based on the master image to connect to the virtualization infrastructure described herein. In some examples, the catalog service 144 procures storage from the IaaS system 104 for the image data store 135 on behalf of the tenant via, for example, one or more API calls to (or other form of interoperation with) the IaaS system 104.

The features of FIG. 1 highlight several of the capabilities of the DaaS provisioning service 136. The virtual networks 112, 114, and 116 are DaaS virtual networks autonomously provisioned and configured by the catalog service 144. As part of provisioning the virtual network 112, the catalog service 144 creates the connector 120, which enables subsequently created virtual desktops 122A-122N to connect with a virtualization infrastructure to make the virtual desktops available to users associated with tenant 1. As part of configuring the virtual network 112 for the first tenant, the catalog service 144 connects (e.g., peers) the virtual network 112 with the virtual network 110, which is administered by the first tenant. This connection enables the connector 120 and the virtual desktops 122A-122N to access resources (e.g., the directory service 106 and the file share 108) located in the on-premises network 102 via the gateway 150. Additionally, when the bastion 124 is needed, the catalog service 144 automates its creation and autonomously reconfigures security rules for the virtual network 112 to allow the bastion 124 to be accessed remotely.

Further, as part of provisioning and configuring the virtual networks 114 and 116, the catalog service 144 configures the connectors 126 and 130 and the virtual desktops 128A-128N and 132 to join a domain that spans tenants by interoperating with the machine directory service 138. Additionally, when the image builder 134 is needed, the catalog service 144 automates its creation and autonomously reconfigures security rules for the virtual network 116 to allow the image builder 134 to be accessed remotely.

It should be noted that, while the DaaS provisioning service shown in FIG. 1 is implemented within the IaaS system 104, this is not a requirement. In other examples, the DaaS provisioning service 136 is implemented within a computing environment that is distinct from the IaaS system that it adapts. In these examples, the machine directory service 138 and/or the user directory service 140 can be implemented within the IaaS system being adapted, within the computing environment hosting the DaaS provisioning service 136, or elsewhere. Moreover, it should be noted that any number of virtual networks and tenants can be supported according to various examples. Additionally or alternatively, in some examples, the directory service 106 and the file share 108 can be implemented within, for example, the virtual network 110 rather than in an on-premises network. In this case, the gateway 150 may be omitted.

DaaS Provisioning Processes

Figure 2:
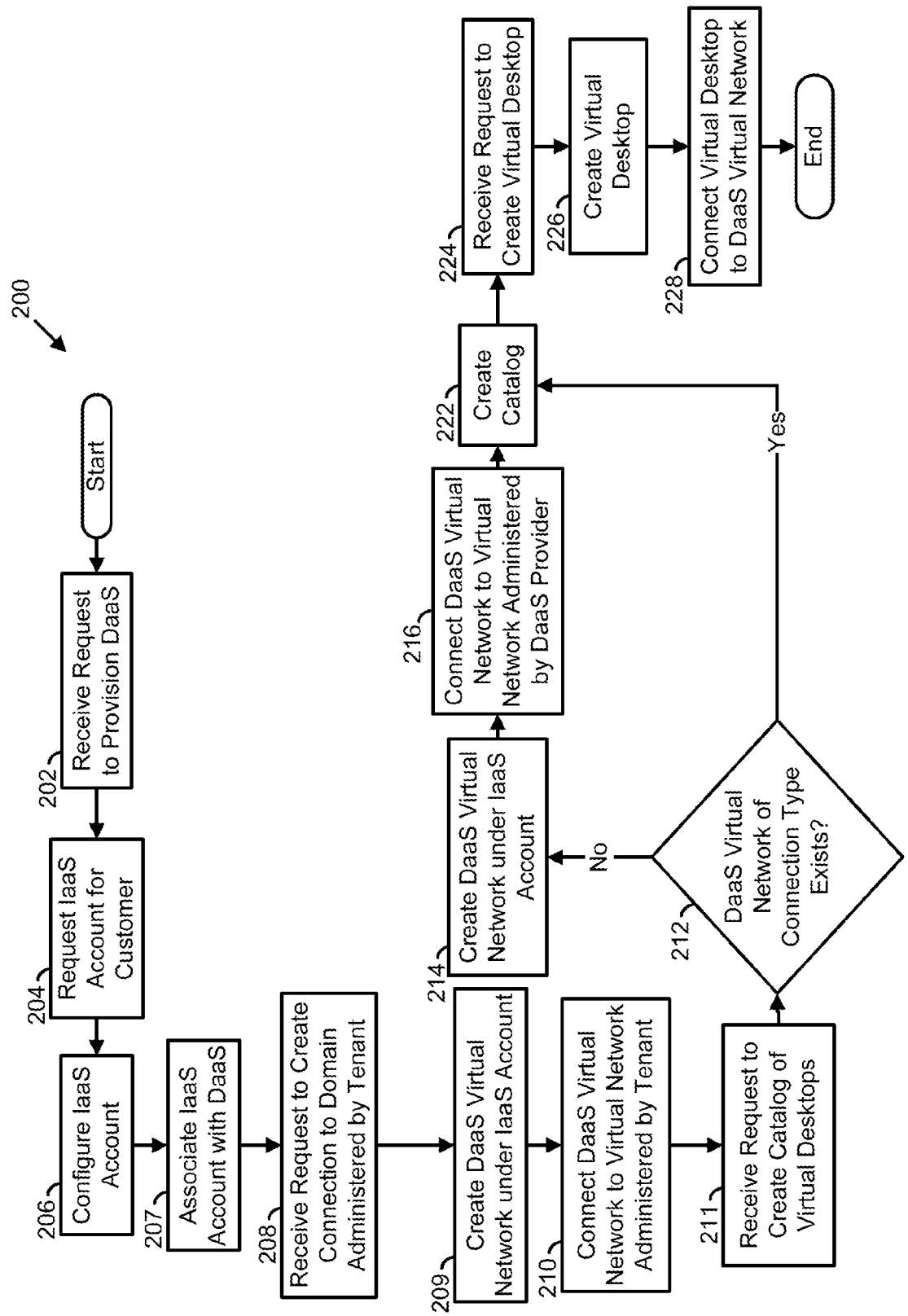
FIG. 2. is a flow diagram showing a DaaS system provisioning and configuration process in accordance with one or more examples described herein.

As described above, at least some examples described herein include a DaaS provisioning service (e.g., the DaaS provisioning service 136 of FIG. 1) configured to execute DaaS autonomous provisioning and configuration processes. FIG. 2 illustrates one such autonomous provisioning and configuration process, the process 200.

As shown in FIG. 2, the process 200 starts with a catalog service (e.g., the catalog service 144 of FIG. 1) receiving 202 a request to provision a DaaS system from a requesting process (e.g., the user interface 142 of FIG. 1). For example, the catalog service can receive one or more API calls from the user interface indicating that a requestor wishes to establish a DaaS system. In response to reception of this provisioning request, the catalog service requests 204 an account for the requestor to be controlled by a DaaS provider (e.g., the provider of the DaaS provisioning service). For example, the catalog service can transmit one or more API calls to (or otherwise interoperate with) an IaaS system (e.g., the IaaS system 104) that is being adapted to provide the requested DaaS system.

Continuing with the process 200, the catalog service configures 206 the newly created IaaS account associated with the requestor-now-tenant to be controlled by the catalog service and, in some implementations, users associated with the DaaS provider. For example, the catalog service can transmit one or more API calls to (or otherwise interoperate with) the IaaS system to change authentication credentials associated with the newly created IaaS account from default or previously specified credentials to new credentials accessible only by the catalog service or users associated with the DaaS provider. Configuring the IaaS account in this manner grants the catalog service and/or the users associated with the DaaS provider authority to administer the IaaS account on behalf of the tenant. In some examples, the catalog service is configured to record an audit trail of its access and/or access by users associated with the DaaS provider. Next, the catalog service associates 207 the IaaS account with tenant. For example, the catalog service can store, in a catalog service data store (e.g., the catalog service data store 146 of FIG. 1), a record associating an identifier of the IaaS account and an identifier of the tenant, with the DaaS system. This association between the IaaS account can be used in subsequent processing to identify the account using the identifier (e.g., name) of the tenant.

Continuing with the process 200, the catalog service receives 208 a request to create a connection to a virtual network (e.g., the virtual network 110 of FIG. 1) administered by the tenant. For example, the catalog service can receive one or more API calls from the user interface indicating that a user associated with the tenant wishes to create a new connection. This connection request can include configuration information specifying attributes of the connection. These attributes can include a type of link for the connection, an identifier of the connection, a range of internet protocol (IP) addresses available for virtual machines to use with the connection, an identifier of the virtual network accessible via the connection, and an identifier (e.g., name) of the connection. The type of link for the connection can be, for example, VNet peering or Citrix SD-WAN™. Within the operation 208, the catalog service stores these connection attribute in the catalog service data store 146 for subsequent processing.

Continuing with the process 200, the catalog service creates 209 a DaaS virtual network under the IaaS account of the DaaS provider and associates the DaaS virtual network with the tenant. For example, the catalog service can transmit one or more API calls to (or otherwise interoperate with) the IaaS to create a virtual network and store, in the catalog service data store, a record associating an identifier of the virtual network, an identifier of a connection type of the DaaS virtual network, and an identifier of the tenant in the catalog service data store. The connection type indicates whether virtual desktops within the DaaS virtual network are to join a domain administered by a tenant or a domain administered by the DaaS provider. A connection type that indicates the virtual desktops are to join a domain administered by a tenant may be referred to as a "domain joined" connection type. A connection type that indicates the virtual desktops are to join a domain administered by the DaaS provider may be referred to as a "non-domain joined" connection type. Virtual desktops with a domain-joined connection type may access other network resources administered by the tenant. Virtual desktop with a non-domain joined connection type may not access other network resources administered by the tenant. Thus, in this example, the DaaS virtual network created in operation 209 is domain joined.

In some examples of the operation 209, the catalog service autonomously provisions one or more connectors (e.g., the connector 120 of FIG. 1) within the newly configured, domain joined DaaS virtual network to enable virtual desktops created within the virtual network to interoperate with the virtualization infrastructure described herein. For example, the catalog service can transmit one or more API calls to (or otherwise interoperate with) the IaaS to create a virtual machine and reimage the virtual machine using an image of a connector. In some examples, the image of the connector is maintained by the DaaS provider and stored in the catalog service data store.

Continuing with the process 200, the catalog service connects 210 the newly created, domain joined DaaS virtual network to a virtual network (e.g., the virtual network 110 of FIG. 1) administered by the tenant. For example, catalog service can transmit one or more API calls to (or otherwise interoperate with) the IaaS to peer the newly created DaaS virtual network to the virtual network administered by the tenant. In certain examples of the operation 210, the catalog service also configures security rules for the DaaS virtual network. In these examples, the catalog service configures security rules to allow communications between virtual desktops and connectors via ports 80, 443, 1494, and 2598 but to deny all other inbound communications. The catalog service also configures the security rules to allow all outbound traffic. For example, catalog service can transmit one or more API calls to (or otherwise interoperate with) the IaaS to add the security rules listed above to the DaaS virtual network.

Continuing with the process 200, the catalog service receives 211 a request to create a catalog of virtual desktops. For example, the catalog service can receive one or more API calls from the user interface indicating that a user associated with the tenant wishes to create a new catalog. This catalog request can include configuration information specifying attributes for virtual desktops included in the catalog. These virtual desktop attributes can include a type of virtual computing session, a machine performance profile, a master image to be applied, a connection type, and a power schedule. In some examples, the types of computing sessions that can be supported by the virtual desktop include multi-session (which allows for multiple users of the same virtual desktop), static session (which allows for a single user and stores changes made by the user), and random session (which allows for a single user but does not store changes made by the user). The connection type indicates whether the virtual desktop is to join a domain administered by a tenant. The configuration information may further include attributes of the catalog itself, such as a catalog name and a maximum number of virtual desktop to be created for the catalog. The machine performance profile can list a type of virtual processor and an amount of virtual memory to be allocated to the virtual desktop.

Continuing with the process 200, the catalog service determines 212 whether a DaaS virtual network associated with the connection type specified in the catalog request exists for the tenant specified in the catalog request. For example, the catalog service can query the catalog service data store for records that associate identifiers of tenants, identifiers of previously created DaaS virtual networks, and identifiers of connection types associated with the previously created DaaS virtual networks. In this example, where the catalog service finds a record in the catalog service data store with identifiers that match the tenant and connection type specified in the catalog request, the catalog service determines 212 that a DaaS virtual network with the connection type specified in the catalog request exists for the tenant. This will be the case, for example, where a user associated with the tenant has previously created a connection as described in operations 208-210 above. Where the catalog service does not find such a record in the catalog service data store, the catalog service determines 212 that a DaaS virtual network associated with the connection type does not exist for the tenant. Where the catalog service determines 212 that a DaaS virtual network associated with the connection type exists for the tenant, the catalog service proceeds to operation 222. Where the catalog service determines 212 that a DaaS virtual network associated with the connection type does not exist for the tenant, the catalog service proceeds to operation 214.

Continuing with the process 200, in operation 214 the catalog service creates a DaaS virtual network under the IaaS account of the DaaS provider and associates the DaaS virtual network with the tenant specified in the request. For example, the catalog service can transmit one or more API calls to (or otherwise interoperate with) the IaaS to create a virtual network and store, in the catalog service data store, a record associating an identifier of the virtual network, an identifier of the connection type (e.g., non-domain joined), and an identifier of the tenant in the catalog service data store. Additionally, in some examples of the operation 214, the catalog service autonomously provisions one or more connectors (e.g., the connector 120 of FIG. 1) within the newly configured DaaS virtual network to enable virtual desktops created within the virtual network to interoperate with the virtualization infrastructure described herein. For example, the catalog service can transmit one or more API calls to (or otherwise interoperate with) the IaaS to create a virtual machine and reimage the virtual machine using an image of a connector. In some examples, the image of the connector is maintained by the DaaS provider and stored in the catalog service data store.

Continuing with the process 200, the catalog service connects 216 the newly created, non-domain joined DaaS virtual network to a virtual network (e.g., the virtual network 118 of FIG. 1) administered by the DaaS provider. For example, catalog service can transmit one or more API calls to the IaaS to peer the newly created DaaS virtual network to the virtual network administered by the DaaS provider. In certain examples of the operation 220, the catalog service also configures security rules for the DaaS virtual network. In these examples, the catalog service configures security rules to allow communications between virtual desktops and connectors via ports 80, 443, 1494, and 2598 but to deny all other inbound communications. The catalog service also configures the security rules to allow all outbound traffic. For example, catalog service can transmit one or more API calls to (or otherwise interoperate with) the IaaS to add the security rules listed above to the DaaS virtual network.

Continuing with the process 200, in operation 222 the catalog service creates a new catalog as specified by the catalog request. For example, catalog service can transmit one or more API calls to (or otherwise interoperate with) the IaaS to create the catalog as specified in the catalog request under the account of the tenant.

Continuing with the process 200, the catalog service receives 224 a request to create a virtual desktop as specified in the catalog. For example, the catalog service can receive one or more API calls from the user interface that includes configuration information specifying an identifier of the catalog and a request to create a virtual desktop belonging to the catalog.

Continuing with the process 200, the catalog service creates 226 the virtual desktop specified in the virtual desktop request and adds the virtual desktop to the catalog. For example, the catalog service can transmit one or more API calls to (or otherwise interoperate with) the IaaS to create a virtual machine and reimage the virtual machine using the master image specified in the by the catalog.

Continuing with the process 200, the catalog service connects 228 the newly created virtual desktop to the DaaS virtual network associated with the connection type specified in the catalog. For example, the catalog service can transmit one or more API calls to (or otherwise interoperate with) the IaaS to connect the newly created virtual desktop to the DaaS virtual network. After operation 228, the process 200 ends.

Figure 3:
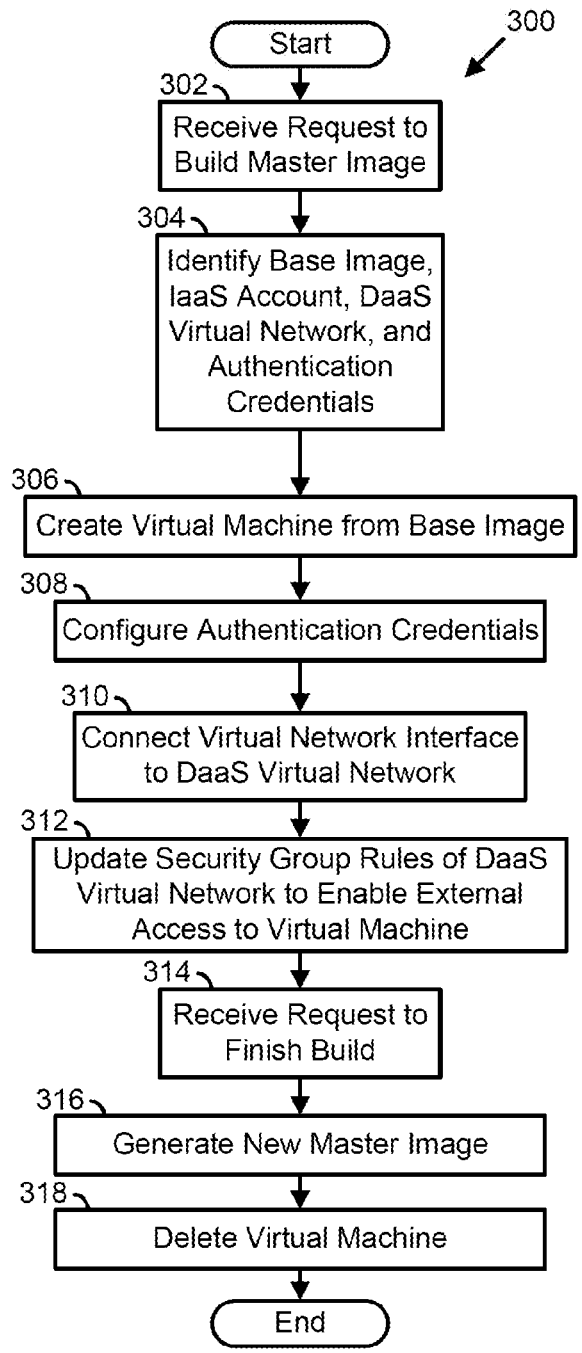
FIG. 3. is a flow diagram showing a master image building process in accordance with one or more examples described herein.

As described above, at least some examples described herein include a DaaS provisioning service (e.g., the DaaS provisioning service 136 of FIG. 1) configured to execute master image building processes. FIG. 3 illustrates one such master image building process, the process 300.

As shown in FIG. 3, the process 300 starts with a catalog service (e.g., the catalog service 144 of FIG. 1) receiving 302 a request to build a master image from a requesting process (e.g., the user interface 142 of FIG. 1). For example, the catalog service can receive one or more API calls from the user interface indicating that a user associated with the tenant wishes to build a new master image. The build request can include configuration information that identifies a pre-existing image upon which to base the new master image. This base image may be maintain by the tenant or the DaaS provider. The build request can further include configuration information that identifies an IaaS account for the tenant, a type of network connection to be utilized by virtual desktops built from the master image, a region in which virtual desktops built from the master image should reside, authentication credentials to access virtual desktops built from the master image, and a machine performance profile for virtual desktops built from the master image.

Continuing with the process 300, the catalog service parses the build request to identify 304 the base image, IaaS account, DaaS virtual network, and authentication credentials specified therein. In some examples, the catalog service identifies the DaaS virtual network by accessing a record from a catalog service data store (e.g., the catalog service data store 146 of FIG. 1) that associates an identifier of the virtual network with an identifier of the tenant and an identifier of the network connection type specified in the build request.

Continuing with the process 300, the catalog service creates 306 a virtual machine (e.g., the image builder 134 of FIG. 1) from the base image identified in the build request. For example, the catalog service can transmit one or more API calls to (or otherwise interoperate with) the IaaS to create a virtual machine and reimage the virtual machine using the base image.

Continuing with the process 300, the catalog service configures 308 authentication credentials used to access the virtual machine. For example, the catalog service can transmit one or more API calls to (or otherwise interoperate with) the IaaS system to change authentication credentials associated with the newly created virtual machine from default credentials to the authentication credentials specified in the build request.

Continuing with the process 300, the catalog service connects 310 the newly created virtual machine to the DaaS virtual network identified from the build request. For example, the catalog service can transmit one or more API calls to (or otherwise interoperate with) the IaaS to connect the newly created virtual machine to the DaaS virtual network. Additionally, in some examples of the operation 310, the catalog service procures an externally addressable internet protocol (IP) address for the virtual machine. For example, the catalog service can transmit one or more API calls to (or otherwise interoperate with) the IaaS to procure the external IP address and assign it to the virtual machine.

Continuing with the process 300, the catalog service updates 312 security rules for the DaaS virtual network identified from the build request. For example, the catalog service can transmit one or more API calls to (or otherwise interoperate with) the IaaS to temporarily allow communication to the virtual machine via a port (e.g., port 3389). This allows users associated with the tenant to access and customize (e.g., install applications, etc.) the virtual machine using remote desktop protocol (RDP) and the authentication credentials specified in the build request.

Continuing with the process 300, the catalog service receives 314 a request to finish the building of the new master image. For example, the catalog service can receive one or more API calls from the user interface that includes configuration information indicating that the user associated with the tenant has completed customizations of the virtual machine.

Continuing with the process 300, the catalog service generates 316 the new master image from the previously created and customized virtual machine. For example, the catalog service can transmit one or more API calls to (or otherwise interoperate with) the IaaS to create the image from the previously created and customized virtual machine.

Continuing with the process 300, the catalog service deletes 318 virtual machine from which the new master image was generated. For example, the catalog service can transmit one or more API calls to (or otherwise interoperate with) the IaaS to delete the virtual machine after imaging of the virtual machine is complete. After operation 318, the process 300 ends.

Figure 4:
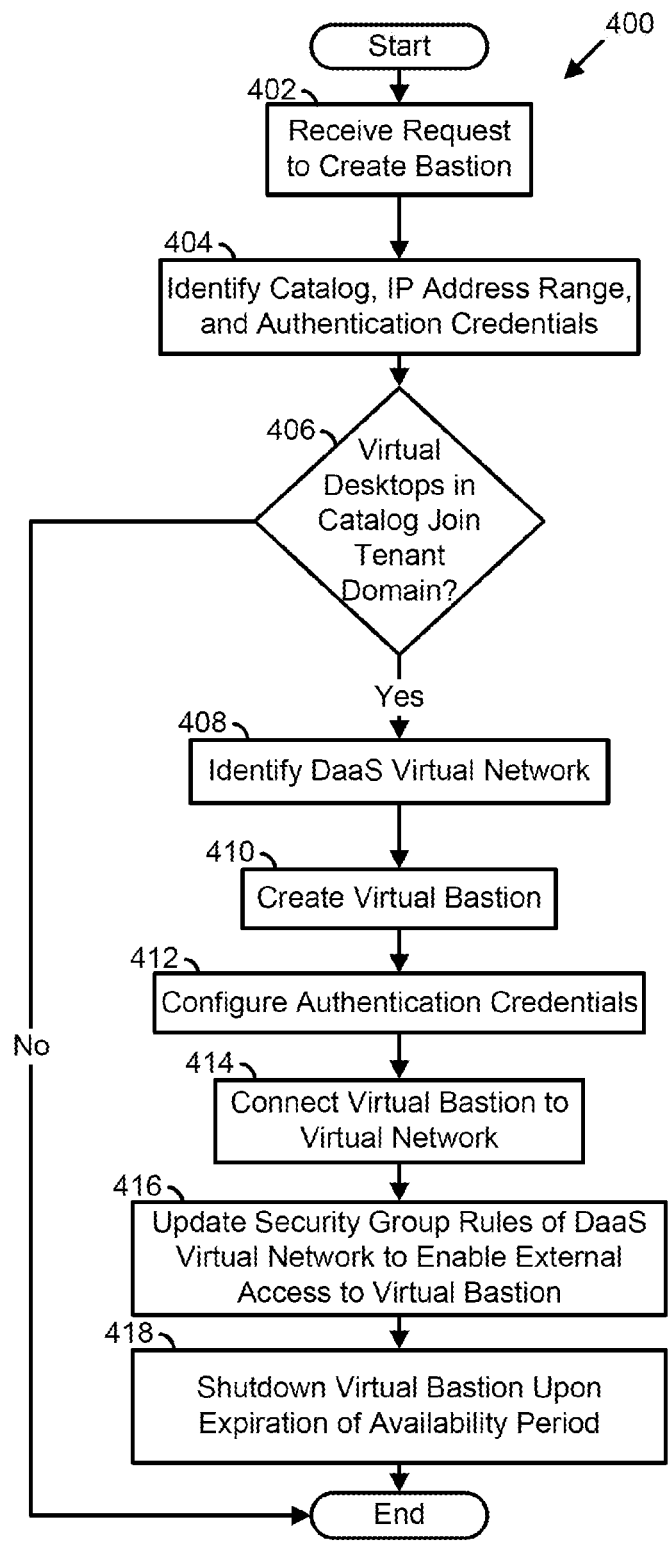
FIG. 4. is a flow diagram showing a bastion creation process in accordance with one or more examples described herein.

As described above, at least some examples described herein include a DaaS provisioning service (e.g., the DaaS provisioning service 136 of FIG. 1) configured to execute bastion creation processes. FIG. 4 illustrates one such bastion creation process, the process 400.

As shown in FIG. 4, the process 400 starts with a catalog service (e.g., the catalog service 144 of FIG. 1) receiving 402 a request to create a virtual bastion from a requesting process (e.g., the user interface 142 of FIG. 1). For example, the catalog service can receive one or more API calls from the user interface indicating that a user associated with the tenant wishes to create a virtual bastion within a DaaS virtual network for troubleshooting purposes. The bastion request can include configuration information that identifies a catalog of virtual desktops to which the virtual bastion is to connect, an IP address range authorized to connect to the bastion (e.g., via RDP), and authentication credentials through which a user associated with the tenant can authenticate to the virtual bastion.

Continuing with the process 400, the catalog service parses the bastion request to identify 404 the catalog, IP address range, and authentication credentials specified therein. The catalog service determines 406 whether the catalog is associated with a connection type that indicates virtual desktops in the catalog join a domain administered by the tenant. For example, the catalog service can identify a record within the catalog service data store that associates an identifier of the catalog specified in the bastion request with an identifier of a connection type associated with the catalog. Where the catalog service determines 406 that the catalog is associated with a connection type that indicates virtual desktops in the catalog join a domain administered by the tenant, the catalog service proceeds to operation 408. Where the catalog service determines 406 that the catalog is associated with a connection type that indicates virtual desktops in the catalog join a domain administered by the DaaS Provider, the catalog service ends the process 400 as virtual bastion access to a shared domain is not allowed.

In the operation 408, the catalog service identifies 408 the DaaS virtual network associated with the catalog. For example, the catalog service can identify a record in the catalog service data store that associates the catalog specified in the bastion request with the DaaS virtual network.

Continuing with the process 400, the catalog service creates 410 a virtual bastion (e.g., the bastion 124 of FIG. 1). For example, the catalog service can transmit one or more API calls to (or otherwise interoperate with) the IaaS to create a bastion host.

Continuing with the process 400, the catalog service configures 412 authentication credentials used to access the virtual bastion. For example, the catalog service can transmit one or more API calls to (or otherwise interoperate with) the IaaS system to change authentication credentials associated with the newly created virtual bastion from default credentials to the authentication credentials specified in the bastion request.

Continuing with the process 400, the catalog service connects 414 the newly created virtual bastion to the DaaS virtual network associated with the catalog. For example, the catalog service can transmit one or more API calls to (or otherwise interoperate with) the IaaS to connect the newly created virtual bastion to the DaaS virtual network. Additionally, in some examples of the operation 414, the catalog service procures an externally addressable internet protocol (IP) address for the virtual bastion. For example, the catalog service can transmit one or more API calls to (or otherwise interoperate with) the IaaS to procure the external IP address and assign it to the bastion host.

Continuing with the process 400, the catalog service updates 416 security rules for the DaaS virtual network. For example, the catalog service can transmit one or more API calls to (or otherwise interoperate with) the IaaS to temporarily allow communication to the bastion via a port (e.g., port 3389) for the IP address range specified in the bastion request and to temporarily allow communication from the bastion to virtual desktops and connectors in the DaaS virtual network via the port. This allows users associated with the tenant to access and troubleshoot the virtual desktops and connectors using RDP and the authentication credentials specified in the bastion request.

Continuing with the process 400, the catalog service powers down 418 the virtual bastion after a predetermined period of availability expires. For example, the catalog service can transmit one or more API calls to (or otherwise interoperate with) the IaaS to shut down the bastion host 8 hours after its initial creation. After operation 418, the process 400 ends.

Each of the processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Computing Devices for DaaS Provisioning Systems

Figure 5:
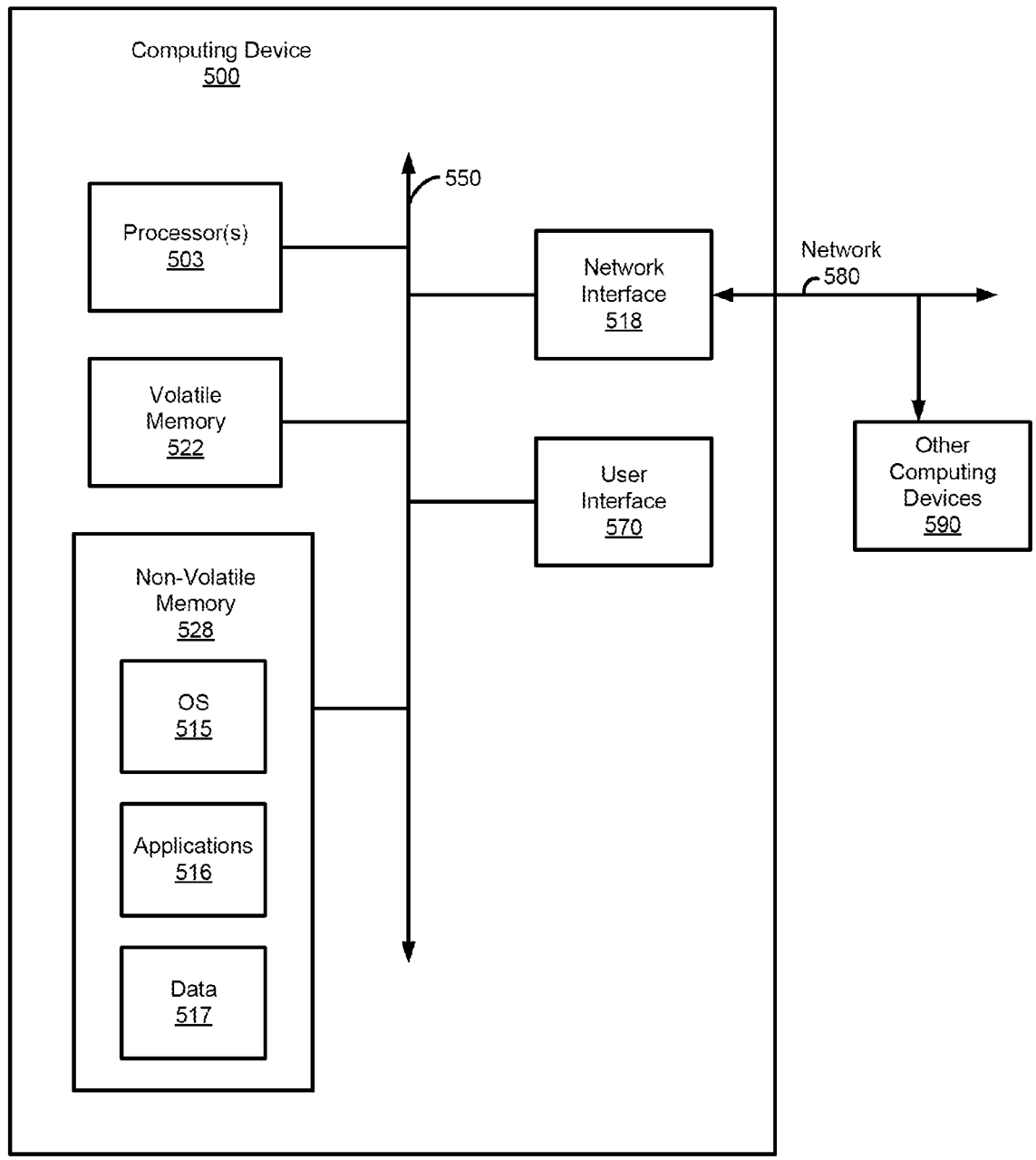
FIG. 5 is a block diagram of a network environment of computing devices in which one or more examples described herein can be implemented.

FIG. 5 is a block diagram of a computing device 500 configured to implement various DaaS systems and processes in accordance with examples disclosed herein.

The computing device 500 includes one or more processor(s) 503, volatile memory 522 (e.g., random access memory (RAM)), non-volatile memory 528, a user interface (UI) 570, one or more network or communication interfaces 518, and a communications bus 550. The computing device 500 may also be referred to as a client device, computing device, endpoint device, computer, or a computer system.

The non-volatile (non-transitory) memory 528 can include one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 570 can include a graphical user interface (GUI) (e.g., controls presented on a touchscreen, a display, etc.) and one or more input/output (I/O) devices (e.g., a mouse, a keyboard, a microphone, one or more speakers, one or more cameras, one or more biometric scanners, one or more environmental sensors, and one or more accelerometers, one or more visors, etc.).

The non-volatile memory 528 stores an OS 515, one or more applications or programs 516, and data 517. The OS 515 and the application 516 include sequences of instructions that are encoded for execution by processor(s) 503. Execution of these instructions results in manipulated data. Prior to their execution, the instructions can be copied to the volatile memory 522. In some examples, the volatile memory 522 can include one or more types of RAM and/or a cache memory that can offer a faster response time than a main memory. Data can be entered through the user interface 570 or received from the other I/O device(s), such as the network interface 518. The various elements of the device 500 described above can communicate with one another via the communications bus 550.

The illustrated computing device 500 is shown merely as an example client device or server and can be implemented within any computing or processing environment with any type of physical or virtual machine or set of physical and virtual machines that can have suitable hardware and/or software capable of operating as described herein.

The processor(s) 503 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor(s) 503 can be analog, digital or mixed. In some examples, the processor(s) 503 can be one or more locally-located physical processors or one or more remotely-located physical processors. The processor(s) 503 can include multiple processor cores and/or multiple processors and can provide functionality for parallel, simultaneous execution of instructions or for parallel, simultaneous execution of one instruction on more than one piece of data.

The network interfaces 518 can include one or more interfaces to enable the computing device 500 to access a computer network 580 such as a Local Area Network (LAN), a Wide Area Network (WAN), a Personal Area Network (PAN), or the Internet through a variety of wired and/or wireless connections, including cellular connections and Bluetooth connections. In some examples, the network 580 may allow for communication with other computing devices 590, to enable distributed computing. The network 580 can include, for example, one or more private and/or public networks over which computing devices can exchange data.

In described examples, the computing device 500 can execute an application on behalf of a user of a client device. For example, the computing device 500 can execute one or more virtual machines managed by a hypervisor. Each virtual machine can provide an execution session within which applications execute on behalf of a user or a client device, such as a hosted desktop session. The computing device 500 can also execute a terminal services session to provide a hosted desktop environment. The computing device 500 can provide access to a remote computing environment including one or more applications, one or more desktop applications, and one or more desktop sessions in which one or more applications can execute.

Figure 6:
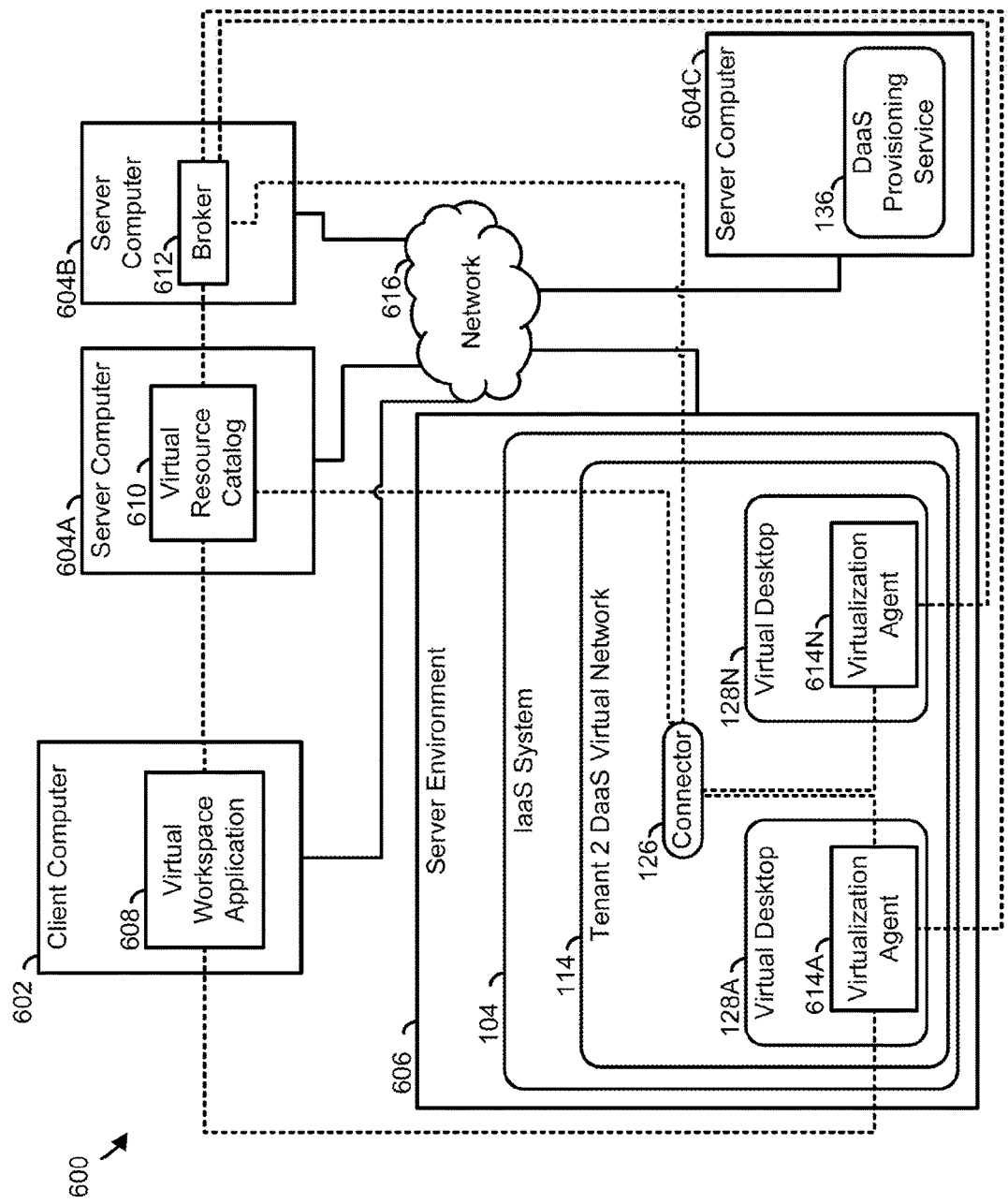
FIG. 6 is a block diagram of the DaaS system of FIG. 1 as implemented within a configuration of computing devices in accordance with one or more examples described herein.

FIG. 6 illustrates selected portions of a DaaS system (e.g., the DaaS system 100 of FIG. 1) configured for operation within a distributed computing system 600 comprising computing devices (e.g. the computing device 500 of FIG. 5). As shown in FIG. 6, the distributed computing system 600 includes a client computer 602, server computers 604A-604C, and a server environment 606. The client computer 602 and the server environment 606 are configured to interoperate with one another via a network 616. Each of the client computer 602, the server computers 604A-604C, the server environment 606, and the network 616 include at least one computing device (e.g., the computing device 500 of FIG. 5). In some examples, the server environment 606 includes a plurality of computing devices structured as a cluster or other high availability, high bandwidth computing platform.

As illustrated in FIG. 6, the client computer 602 is configured to host a virtual workspace application 608 (e.g., a Citrix Workspace™ client or a browser). The server computer 604A is configured to host a virtual resource catalog 610 (e.g., a Citrix® StoreFront™ service or Citrix Workspace™ service). The server computer 604B is configured to host a virtual resource broker 612. In some examples, the server computer 604B is a Citrix® delivery controller. The server computer 604C is configured to host the DaaS provisioning service 136 of FIG. 1. The server environment 606 is configured to host the IaaS system of FIG. 1, which includes the virtual network 114. The virtual network 114 includes the virtual desktops 128A-128N and the connector 126. The virtual desktops 128A-128N are configured to host virtualization agents 614A-614N (e.g., a Citrix® VDAs). The connector 126 is configured to host a connection service (e.g., a Citrix Cloud Connector™ service). Some of the components illustrated in FIG. 6 are described above. For purposes of brevity, those descriptions will not be repeated here, but each of these computer-implemented processes is configured to function with reference to FIG. 6 as described with reference to its respective figure.

Together the virtual workspace application 608, the virtual resource catalog 610, the virtual resource broker 612, the connector 126, and the virtualization agents 614A-614N make up a virtualization infrastructure that enables a user of the client computer 602 to access the virtual desktops 128A-128N and execute virtual computing sessions on the virtual desktops 128A-128N. The computer-implemented processes of this virtualization infrastructure interoperate to manage and deliver applications, data, and desktops to the endpoint device 602 of a user in a consistent and secure manner, regardless of the user's device or location. The virtualization infrastructure enhances the user experience by streamlining and automating those tasks that a user performs frequently, such as approving expense reports, confirming calendar appointments, submitting helpdesk tickets, and reviewing vacation requests. The virtualization infrastructure allows users to access functionality provided by multiple enterprise applications—including "software as a service" (SaaS) applications, web applications, desktop applications, and proprietary applications—through a single interface.

The distributed computing system 600 is but one example of many potential configurations that can be used to implement DaaS systems. As such, the examples disclosed herein are not limited to the particular configuration of computing device and other configurations are considered to fall within the scope of this disclosure.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including", "comprising", "having", "containing", and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The invention claimed is:

1. A computer system configured to autonomously provision at least a portion of a desktop as a service (DaaS) system via a computing service, the computer system comprising:
   a memory;
   a network interface; and
   at least one processor coupled to the memory and the network interface and configured to:
   receive, via the network interface, a request to add a catalog of virtual desktops to an account associated with a tenant of the computing service, and
   transmit, in response to reception of the request, a plurality of requests to the computing service, the plurality of requests comprising:
   at least one request to create a first virtual network associated with the tenant within the computing service,
   at least one request to connect the first virtual network to a second virtual network within the computing service,
   at least one request to create the catalog within the computing service;
   at least one request to create a connector, the connector being configured to couple one or more virtual desktops to a virtualization infrastructure; and
   at least one request to connect the connector to the first virtual network.

2. The computer system of claim 1, the tenant being a first tenant and the at least one processor being further configured to:
   receive, via the network interface, at least one request to add at least one catalog to at least one account associated with a second tenant of the computing service, the second tenant being distinct from the first tenant; and
   transmit, in response to reception of the at least one request, at least one plurality of requests to the computing service, the at least one plurality of requests comprising:
   at least one request to create at least one virtual network associated with the second tenant within the computing service,
   at least one request to connect the at least one virtual network to the second virtual network, and
   at least one request to create the at least one catalog within the computing service.

3. The computer system of claim 2, the second virtual network being associated with and administered by a third tenant distinct from the first tenant and the second tenant.

4. The computer system of claim 3, the memory storing:
   first account information associating the first tenant with a first account within the computing service;
   second account information associating the second tenant with a second account with the computing service; and
   third account information associating the third tenant with a third account with the computing service, the first account information, the second account information, and the third account information being distinct from one another.

5. The computer system of claim 1, the plurality of requests further comprising at least one request to configure one or more security rules of the first virtual network.

6. The computer system of claim 1, the second virtual network providing connectivity to a directory service.

7. The computer system of claim 6, the tenant being a first tenant, the second virtual network being administered by and associated with a second tenant distinct from the first tenant, and the directory service being administered by and associated with the second tenant.

8. The computer system of claim 7, the directory service storing objects for virtual machines and connectors and omitting objects for users.

9. The computer system of claim 1, the at least one processor being further configured to:
   transmit, to the computing service, at least one request to create a virtual desktop based on a master image specified in the catalog; and
   transmit, to the computing service, at least one request to connect the virtual desktop to the first virtual network.

10. The computer system of claim 1, the at least one processor being further configured to:
    receive, via the network interface, a troubleshooting request to add a bastion to the first virtual network; and
    transmit, in response to reception of the troubleshooting request, a one or more requests to the computing service, the one or more requests comprising:
    at least one request to create the bastion,
    at least one request to connect the bastion to the first virtual network, and at least one request to update security rules applicable to the first virtual network to enable external access to the bastion.

11. The computer system of claim 1, the at least one processor being further configured to:
receive, via the network interface, a build request to build a master image, the build request specifying an image upon which to base the master image; and
transmit, in response to reception of the build request, a one or more requests to the computing service, the one or more requests comprising:
at least one request to create a virtual machine,
at least one request to reimage the virtual machine using an image specified in the build request,
at least one request to connect the virtual machine to the first virtual network, and
at least one request to update security rules applicable to the first virtual network to enable external access to the virtual machine.

12. The computer system of claim 1, further comprising the computing service, the computing service being an infrastructure as a service (IaaS) system.

13. The computer system of claim 12, the plurality of requests being a plurality of application programming interface calls to the IaaS system.

14. A method of autonomously provisioning at least a portion of a desktop as a service (DaaS) system, the method comprising:
receiving, via a network interface, a request to add a catalog of virtual desktops to an account associated with a tenant of a computing service, and
transmitting, in response to reception of the request, a plurality of requests to a computing service, the plurality of requests comprising:
at least one request to create a first virtual network associated with the tenant within the computing service,
at least one request to connect the first virtual network to a second virtual network within the computing service,
at least one request to create the catalog within the computing service,
at least one request to create a connector, the connector being configured to couple one or more virtual desktops to a virtualization infrastructure, and
at least one request to connect the connector to the first virtual network.

15. The method of claim 14, the tenant being a first tenant, the method further comprising:
receiving, via the network interface, at least one request to add at least one catalog to at least one account associated with a second tenant of the computing service, the second tenant being distinct from the first tenant; and
transmitting, in response to reception of the at least one request, at least one plurality of requests to the computing service, the at least one plurality of requests comprising:
at least one request to create at least one virtual network associated with the second tenant within the computing service,
at least one request to connect the at least one virtual network to the second virtual network, the second virtual networking being associated with and administered by a third tenant distinct from the first tenant and the second tenant, and
at least one request to create the at least one catalog within the computing service.

16. The method of claim 14, further comprising:
transmitting, to the computing service, at least one request to create a virtual desktop based on a master image specified in the catalog; and
transmitting, to the computing service, at least one request to connect the virtual desktop to the first virtual network.

17. A non-transitory computer readable medium storing executable sequences of instructions to autonomously provision at least a portion of a desktop as a service (DaaS) system, the sequences of instructions comprising instructions to:
receive, via a network interface, a request to add a catalog of virtual desktops to an account associated with a tenant of a computing service, and
transmit, in response to reception of the request, a plurality of requests to a computing service,
the plurality of requests comprising:
at least one request to create a first virtual network associated with the tenant within the computing service,
at least one request to connect the first virtual network to a second virtual network within the computing service,
at least one request to create the catalog within the computing service,
at least one request to create a connector, the connector being configured to couple one or more virtual desktops to a virtualization infrastructure, and
at least one request to connect the connector to the first virtual network.

18. The non-transitory computer readable medium of claim 17, the tenant being a first tenant, the sequences of instructions further comprising instructions to:
receive, via the network interface, at least one request to add at least one catalog to at least one account associated with a second tenant of the computing service, the second tenant being distinct from the first tenant; and
transmit, in response to reception of the at least one request, at least one plurality of requests to the computing service, the at least one plurality of requests comprising:
at least one request to create at least one virtual network associated with the second tenant within the computing service,
at least one request to connect the at least one virtual network to the second virtual network, the second virtual networking being associated with and administered by a third tenant distinct from the first tenant and the second tenant, and
at least one request to create the at least one catalog within the computing service.

19. The non-transitory computer readable medium of claim 17, the sequences of instructions further comprising instructions to:
transmit, to the computing service, at least one request to create a virtual desktop based on a master image specified in the catalog; and
transmit, to the computing service, at least one request to connect the virtual desktop to the first virtual network.

* * * * *